US011922609B2

(12) United States Patent
Mosleh et al.

(10) Patent No.: US 11,922,609 B2
(45) Date of Patent: Mar. 5, 2024

(54) END TO END DIFFERENTIABLE MACHINE VISION SYSTEMS, METHODS, AND MEDIA

(71) Applicants: Ali Mosleh, Longueil (CA); Vahid Partovi Nia, Montreal (CA)

(72) Inventors: Ali Mosleh, Longueil (CA); Vahid Partovi Nia, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 17/204,684

(22) Filed: Mar. 17, 2021

(65) Prior Publication Data

US 2022/0301123 A1 Sep. 22, 2022

(51) Int. Cl.
| | |
|---|---|
| G06T 5/00 | (2006.01) |
| G06F 18/2132 | (2023.01) |
| G06F 18/214 | (2023.01) |
| G06N 3/08 | (2023.01) |
| G06T 1/00 | (2006.01) |

(Continued)

(52) U.S. Cl.
CPC .......... *G06T 5/009* (2013.01); *G06F 18/2132* (2023.01); *G06F 18/214* (2023.01); *G06N 3/08* (2013.01); *G06T 1/0014* (2013.01); *G06T 3/4015* (2013.01); *G06T 5/002* (2013.01); *G06T 5/20* (2013.01); *G06T 2207/20081* (2013.01)

(58) Field of Classification Search
CPC ..... G06T 5/009; G06T 1/0014; G06T 3/4015; G06T 5/002; G06T 5/20; G06T 2207/20081; G06K 9/6234; G06K 9/6256; G06N 3/08; H04N 9/735; H04N 17/002; G06V 10/82
See application file for complete search history.

(56) References Cited

U.S. PATENT DOCUMENTS

| | | | | |
|---|---|---|---|---|
| 9,727,947 | B2 * | 8/2017 | Koskinen | H04N 5/217 |
| 10,713,537 | B2 | 7/2020 | Heide | |
| 2008/0266413 | A1 * | 10/2008 | Cohen | H04N 5/3572 |
| | | | | 348/222.1 |
| 2009/0077359 | A1 * | 3/2009 | Chakravarthula | G06T 5/20 |
| | | | | 712/229 |

(Continued)

FOREIGN PATENT DOCUMENTS

| | | |
|---|---|---|
| CN | 106650782 A | 5/2017 |
| CN | 110087071 A | 8/2019 |

(Continued)

OTHER PUBLICATIONS

Dong, Weishong, et al. "Joint demosaicing and denoising with perceptual optimization on a generative adversarial network." arXiv preprint arXiv:1802.04723 (2018). (Year: 2018).*

(Continued)

*Primary Examiner* — Andrae S Allison

(57) ABSTRACT

End to end differentiable machine vision systems, training methods, and processor-readable media are disclosed. A differentiable image signal processor (ISP) is disclosed that can be trained, using machine learning techniques, to adapt raw images received from a new sensor into an adapted images of the same type (i.e. in the same visual domain) as the images previously used to train a perception module, without fine-tuning the perception module itself. The differentiable ISP may include functional blocks for performing specific image enhancement operations using a relatively small number of learned parameters corresponding to meaningful characteristics of the image enhancement operations.

16 Claims, 7 Drawing Sheets

(51) Int. Cl.
*G06T 3/40* (2006.01)
*G06T 5/20* (2006.01)

(56) References Cited

U.S. PATENT DOCUMENTS

| | | | | |
|---|---|---|---|---|
| 2011/0298945 | A1* | 12/2011 | Chen | H04N 5/2351 348/223.1 |
| 2012/0257079 | A1* | 10/2012 | Ninan | H04N 9/04557 348/222.1 |
| 2013/0229541 | A1* | 9/2013 | Webb | H04N 5/23229 348/222.1 |
| 2016/0080626 | A1* | 3/2016 | Kovtun | H04N 5/2355 348/218.1 |
| 2017/0185871 | A1* | 6/2017 | Zhang | G06K 9/6271 |
| 2019/0387205 | A1* | 12/2019 | Chuang | G06T 3/4007 |
| 2020/0234402 | A1* | 7/2020 | Schwartz | G06T 5/002 |
| 2020/0389588 | A1* | 12/2020 | Sharma | H04N 5/23229 |

FOREIGN PATENT DOCUMENTS

| | | |
|---|---|---|
| CN | 110414546 A | 11/2019 |
| CN | 111726592 A | 9/2020 |

OTHER PUBLICATIONS

Brady et al, Deep learning for camera data acquisition, control, and image estimation, vol. 12, No. 4 / Dec. 2020 / Advances in Optics and Photonics 789 (Year: 2020).*

Prakash et al, Deep Learning Approach for Image Denoising and Image Demosaicing, International Journal of Computer Applications (0975-8887), vol. 168—No. 9, Jun. 2017 (Year: 2017).*

Afifi, Mahmoud. "Semantic white balance: Semantic color constancy using convolutional neural network." arXiv preprint arXiv:1802.00153 (2018). (Year: 2018).*

Mosleh, A. et al., "Hardware-in-the-loop End-to-end Optimization of Camera Image Processing Pipelines", IEEE/CVF Conference on Computer Vision and Pattern Recognition (CVPR), pp. 7529-7538, 2020.

Tseng, T. et al., "Hyperparameter Optimization in Black-box Image Processing using Differentiable Proxies", ACM Transactions on Graphics (SIGGRAPH), 38(4):27-1, 2019.

Ratnasingam, S., "Deep Camera: A Fully Convolutional Neural Network for Image Signal Processing", 2019 IEEE/CVF International Conference on Computer Vision Workshop (ICCVW), Seoul, Korea (South), 2019, pp. 3868-3878, doi: 10.1109/ICCVW.2019.00480.

Ignatov, A. et al., "Replacing Mobile Camera ISP with a Single Deep Learning Model", 2020 IEEE/CVF Conference on Computer Vision and Pattern Recognition Workshops (CVPRW), Seattle, WA, USA, 2020, pp. 2275-2285, doi: 10.1109/CVPRW50498.2020.00276.

Liang, Zhetong et al., "CameraNet: A Two-Stage Framework for Effective Camera ISP Learning", arXiv:1908.01481v2 [eess.IV] Aug. 8, 2019.

Schwartz, E. et al., "DeepISP: Towards Learning an End-to-End Image Processing Pipeline", arXiv:1801.06724v2 [eess.IV] Feb. 3, 2019.

* cited by examiner

END TO END DIFFERENTIABLE MACHINE VISION SYSTEMS, METHODS, AND MEDIA

FIELD

The present disclosure relates to systems, methods, and processor-readable media for training of a machine learning-based machine vision system, and in particular to end to end differentiable machine vision systems, methods, and processor-readable media.

BACKGROUND

High-level machine vision has become ubiquitous in a wide variety of vision systems, ranging from commodity camera systems in mobile phones to applications such as video surveillance, robotics, driver assistance systems, self-driving vehicles, and medical diagnosis. Many of these machine vision systems use an image acquisition system consisting of optical components and photosensitive components (also called a camera or simply a "sensor"), to generate raw images. The raw images are then processed by an image signal processor (ISP). The function of a conventional ISP is to transform the raw images received from the sensor into an enhanced image, also called an "adapted image", which is typically optimized for human viewers. However, the enhancement or adaptation performed on the raw images by the ISP does not typically generate adapted images optimized for use by non-human perception modules located downstream of the ISP, as the ISP is typically designed to optimize for human viewers without being aware of the particular configuration of the perception module.

FIG. 1 shows an example machine vision system 100. The machine vision system 100 includes a sensor 102 (including optics 104 and photosensor 106) that generates raw images 112, and an ISP 108 that processes the raw images 112 to generate adapted images 114. A perception module 110, such as an artificial neural network or other machine learned model trained to perform image perception tasks, such as image classification or object detection, receives the adapted images 114 as input and processes the adapted images 114 to generate image perception information 116, such as labels, logits, bounding boxes, masks, or other predicted data. The perception module is often pre-trained on a large-scale labelled image dataset (i.e. a dataset that includes labelled images) in order to be useful across a variety of perception tasks and visual domains. The visual domain of the adapted images 114 may change due to a change in either the ISP 108 or the hardware configuration of the sensor 102, thereby resulting in adapted images 114 of a different image type (e.g., having different patterns of image characteristics) than those generated by the previous configuration of the ISP 108 and sensor 102. However, due to the visual domain shifts caused by variations in radiometric and geometric specifications from one sensor to another, and also due to different imaging conditions, the perception module 110 typically does not generalize well to the full range of possible adapted image types. Therefore, the machine vision system 100 performs well only once its imaging pipeline (sensor 102 and ISP 108) is optimized regarding the perception module's 110 perception task performance and/or the perception module 110 is fine-tuned on a dataset generated using that specific imaging pipeline. A typical practice is to choose a well-performing off-the-shelf perception module 110, depending on the perception task required for the current application, and fine-tune the perception module 110 to perform the perception task accurately using the images produced by the imaging pipeline of the current device or hardware platform.

An ISP is typically designed as a cascade of hand-crafted processing blocks, often designed separately regardless of the interaction between them. These processing blocks need to operate power-efficiently at real-time rates, which is critical for applications in robotics, self-driving vehicles, IoT devices, cellular phones, and outdoor or indoor smart cameras, among others. Hence, machine vision systems tend to use traditional hardware-based ISPs and avoid high-capacity image processing blocks such as deep neural networks.

Some existing approaches have applied machine learning techniques to optimize the end-to-end performance of a machine vision system with regard to a particular sensor 102. Typically, images generated by the sensor 102 are labelled and used as training data to generate image perception information 116, which in turn is compared to the ground truth labels of the training data to generate a loss, which is back-propagated through the perception module 110 and ISP 108 to optimize the operational parameters of each component. However, optimizing a hardware ISP to minimize an end-to-end loss is challenging, because the parameter space of the ISP 108 is formed by tens to hundreds of categorical and continuous parameters that can affect the downstream task in a complex and nonlinear manner via the intermediate ISP image output (i.e. the adapted images 202). Several recent works aim at automating this process by solving ISP hyperparameter optimization problems in an end-to-end fashion. One such work is Ali Mosleh, Avinash Sharma, Emmanuel Onzon, Fahim Mannan, Nicolas Robidoux, and Felix Heide. "Hardware-in-the-loop end-to-end optimization of camera image processing pipelines". In IEEE/CVF Conference on Computer Vision and Pattern Recognition (CVPR), pages 7529-7538, 2020 (hereinafter "Mosleh"). Another such work is Ethan Tseng, Felix Yu, Yuting Yang, Fahim Mannan, Karl ST Arnaud, Derek Nowrouzezahrai, Jean-Francois Lalonde, and Felix Heide. "Hyperparameter optimization in black-box image processing using differentiable proxies". ACM Transactions on Graphics (SIGGRAPH), 38(4):27-1, 2019 (hereinafter "Tseng").

However, these existing approaches have significant limitations. The Tseng approach require significant effort to model a differentiable approximation of the actual hardware ISP to enable joint optimization of the ISP 108 and the perception module 110. The Mosleh approach uses 0-th order solvers and avoids fine-tuning the perception model along with the ISP. In both cases, it is often difficult and costly to obtain enough labelled data (i.e., human-annotated images generated by the sensor 102) to properly optimize the large number of parameters employed in the ISP 108 and perception module 110 in series.

Conventionally, a hardware ISP comes with a set of hyperparameters that needs to be optimized with regard to the downstream perception module 110. Several approaches attempt to automate this process for different perception tasks through hyperparameter optimization. One such approach is described in U.S. patent application Ser. No. 16/025,776 to Heide, entitled "Method and apparatus for joint image processing and perception" (hereinafter "Heide"). The Heide patent application discloses an end-to-end differentiable architecture for joint denoising, deblurring, and classification that attempts to make classification robust to realistic noise and blur. This approach uses a differentiable end to end machine vision system in order to enable the use of machine learning techniques. However, the approach in Heide uses a small number of simple processing blocks to pre-process the images and requires a pre-calibration step to initiate the optimization process to correct for some image formation characteristics such as lens blur and noise level. In addition, like the other approaches described above, Heide requires a dataset of labelled images in order to perform the joint end-to-end optimization.

There therefore exists a need for approaches to configuring a machine vision system to enable end-to-end optimization that address at least some of the limitations described above.

SUMMARY

In various examples, the present disclosure presents end to end differentiable machine vision systems, methods, and processor-readable media. A differentiable ISP is disclosed that can be trained, using machine learning techniques, to adapt raw images received from a new sensor into an adapted images of the same type (i.e. in the same visual domain) as the images used to train the perception module. This may eliminate the need to re-train or fine-tune the perception module itself.

As used herein, the term "end to end" refers to the behavior of a machine vision system from the sensor to the output of the perception module, i.e. image perception information. The term "differentiable" refers to a system, or portion of a system, whose output can be differentiated (i.e. its rate of change can be computed) with respect to one or more parameter values controlling the behavior of the system or subsystem. The term "module" refers to a portion of a device or process that performs a specific set of operations, and may include hardware logic and/or software instructions executable by a processor.

As used herein, the term "data annotation" or "data labelling", or simply "annotation" or "labelling", refers to the process of adding metadata to the images of a dataset. This metadata usually takes the form of tags or labels, which can be added to images or videos as part of developing a training dataset for machine learning. The metadata comes in a variety of forms, from bounding boxes, which are imaginary boxes drawn on images or video frames, to semantic segmentation, wherein every pixel in an image is assigned a semantic label. Such metadata usually helps to train a model to recognize the annotated area as a distinct type of object. The metadata often serves as a ground truth for models trained to perform image perception tasks, such as the perception modules described herein.

In an aspect, the present disclosure describes a method for training a differentiable image signal processor (ISP) of a machine vision system using machine learning. A plurality of raw images captured by a sensor are obtained. The raw images are of a sensor-specific type. A plurality of training images that have been used together with supervised learning to train a perception module to perform an image perception task are obtained. The training images are of a perception module-specific type. The differentiable ISP is trained, using semi-supervised learning, to process the raw images of the sensor-specific type to generate adapted images of the perception module-specific type, using the plurality of training images and the plurality of raw images.

By training a GAN, using unsupervised learning, to generate adapted images in the visual domain of the images used to train the perception module, the end-to-end operation of the machine vision system can be optimized with regard to the visual domain of the raw images generated by a new sensor, without adjusting the learned parameters of the perception module, and without requiring the generation of labelled training data (i.e. labelled images).

Training the differentiable ISP using semi-supervised learning may include classifying, using a discriminator, the training images and the adapted images, thereby generating classification information comprising binary classification information; generating discriminator loss information and differentiable ISP loss information based on the classification information; processing the differentiable ISP loss information to adjust a plurality of learnable parameters of the differentiable ISP; and processing the discriminator loss information to adjust a plurality of learnable parameters of the discriminator.

Training the differentiable ISP using semi-supervised learning further may further alternating between: repeating, one or more times, generating the discriminator loss information and processing the discriminator loss information to adjust the plurality of learnable parameters of the discriminator; and repeating, one or more times, generating the differentiable ISP loss information and processing the differentiable ISP loss information to adjust the plurality of learnable parameters of the differentiable ISP.

The discriminator may include a convolutional neural network.

In another aspect, the present disclosure describes a machine vision system, comprising a differentiable image signal processor trained in accordance with one or more of the methods described above.

The machine vision system may further comprise the perception module, the perception module being configured to perform the image perception task by processing adapted images of the perception module-specific type.

The plurality of training images may be generated by a previous image signal processor by processing a previous plurality of raw images of a previous sensor-specific type, and the previous plurality of raw images were generated by a previous sensor.

The machine vision system may further comprise a sensor configured to generate the raw images of the sensor-specific type.

The differentiable image signal processor may comprise a block-wise differentiable image signal processor comprising a plurality of functional modules. Each functional module comprises a respective subset of the learned parameters of the differentiable ISP. Each functional module performs a respective image processing task. Each image processing task is selected from a list consisting of: black level correction, demosaicing, white balancing, sharpening, color correction, and tone map correction.

By using a block-wise differentiable ISP including functional blocks for performing specific image enhancement operations, a relatively small number of learned parameters corresponding to meaningful characteristics of the image enhancement operations may be used. This may increase the efficiency of the ISP, allow the ISP to be trained more rapidly, and avoid over-parameterization leading to overfitting of the ISP output to the specific images used to train the perception module.

The plurality of functional modules may comprise, in series, the following: a black level correction module for processing the raw images to generate black-level corrected images based on learned parameters comprising a black value and a white value. A demosaicing module for processing the black-level corrected images to generate demosaiced images by performing color-channel filtering based on learned parameters comprising: three low-pass filters corresponding to three color channels of the black-level corrected images, each low-pass filter comprising four scalar learned parameter values, and three scalar weight factors for controlling inter-channel correlation of high-frequency characteristics. A white balancing module for generating white-balanced images by applying gain to each of the three color channels of the demosaiced images based on learned parameters comprising three gain values. A sharpening module for generating sharpened images by deblurring each color channel of the white-balanced images in the frequency domain based on learned parameters comprising three deblurring matrices corresponding to the three color channels, each deblurring matrix comprising no more than 100 scalar learned parameters. A color correction module for generating color-corrected images by applying a color correction matrix to the three color channels of the sharpened images, the color correction matrix being a three-by-three matrix comprising nine scalar color correction learned parameters. A tone map correction module for generating the adapted images by applying gamma correction and sigmoid curve remapping the color-corrected images, based on learned parameters comprising: a low-intensity curve parameter for determining a curve to be applied to low-intensity pixels, a high-intensity curve parameter for determining a curve to be applied to high-intensity pixels, and a knee parameter for determining a threshold between low-intensity pixels and high-intensity pixels.

By using the specific functional blocks with the specific parameters described above, the number of parameters of the ISP may be very low (e.g., 108, or fewer than 1000). This may exhibit additional advantages in terms of efficiency of operation, speed of training, and avoiding over-fitting.

The plurality of functional modules may comprise an enhancement network comprising a convolutional neural network configured to process images received by the enhancement network to generate enhancement network output images by filtering non-Gaussian noise.

The plurality of functional modules may comprise a color correction module for generating color-corrected images by applying a color correction matrix to three color channels of images received by the color correction module. The differentiable image signal processor further comprises a color encoder network comprising a convolutional neural network comprising a further subset of the learned parameters of the differentiable ISP. The color encoder network is configured to generate the color correction matrix based on the images received by the color correction module.

By using a color encoding network, the learned parameters of the color correction module may be optimized using a robust, flexible neural network.

In still another aspect, the present disclosure describes a computing system. The computing system comprises a processor device, and a memory storing machine-executable instructions of a machine vision system. The machine-executable instructions, when executed by the processing device, cause the machine vision system to perform a number of operations. A plurality of raw images captured by a sensor are obtained. The raw images are processed using a differentiable image signal processor to generate adapted images of a perception module-specific type. The adapted images are processed using a perception module to perform an image perception task. The differentiable image signal processor comprises a block-wise differentiable image signal processor comprising a plurality of functional modules. Each functional module comprises one or more learned parameters. Each functional module performs a respective image processing task. Each image processing task is selected from a list consisting of: black level correction, demosaicing, white balancing, sharpening, color correction, and tone map correction.

The plurality of functional modules may comprise, in series, the following: a black level correction module for processing the raw images to generate black-level corrected images based on learned parameters comprising a black value and a white value. A demosaicing module for processing the black-level corrected images to generate demosaiced images by performing color-channel filtering based on learned parameters comprising: three low-pass filters corresponding to three color channels of the black-level corrected images, each low-pass filter comprising four scalar learned parameter values, and three scalar weight factors for controlling inter-channel correlation of high-frequency characteristics. A white balancing module for generating white-balanced images by applying gain to each of the three color channels of the demosaiced images based on learned parameters comprising three gain values. A sharpening module for generating sharpened images by deblurring each color channel of the white-balanced images in the frequency domain based on learned parameters comprising three deblurring matrices corresponding to the three color channels, each deblurring matrix comprising no more than 100 scalar learned parameters. A color correction module for generating color-corrected images by applying a color correction matrix to the three color channels of the sharpened images, the color correction matrix being a three-by-three matrix comprising nine scalar color correction learned parameters. A tone map correction module for generating the adapted images by applying gamma correction and sigmoid curve remapping the color-corrected images, based on learned parameters comprising: a low-intensity curve parameter for determining a curve to be applied to low-intensity pixels, a high-intensity curve parameter for determining a curve to be applied to high-intensity pixels, and a knee parameter for determining a threshold between low-intensity pixels and high-intensity pixels.

The computing system may further comprise a sensor configured to generate the raw images.

The plurality of functional modules may further comprise an enhancement network comprising a convolutional neural network configured to process images received by the enhancement network to generate enhancement network output images by filtering non-Gaussian noise.

By using an enhancement network, the ISP's robustness against various conditions such as different lighting conditions, more severe blur and noise, and so on may be improved.

The plurality of functional modules of the machine vision system may comprise a color correction module for generating color-corrected images by applying a color correction matrix to three color channels of images received by the color correction module. The differentiable image signal processor further comprises a color encoder network comprising a convolutional neural network comprising a further subset of the learned parameters of the generator. The color encoder network is configured to generate the color correction matrix based on the images received by the color correction module.

The differentiable ISP may be trained in accordance with one or more of the methods described above.

In still another aspect, the present disclosure describes a non-transitory processor-readable medium having stored thereon values of a plurality of learned parameters of a differentiable image signal processor trained in accordance with one or more of the methods described above.

In still another aspect, the present disclosure describes a non-transitory processor-readable medium having machine-executable instructions stored thereon which, when executed by a processing device of a computing system, cause the system to perform a number of operations. Raw images of a sensor-specific type are obtained. The raw images are processed using a differentiable image signal processor to generate adapted images of a perception module-specific type. The differentiable image signal processor comprises a block-wise differentiable image signal processor comprising a plurality of functional modules. Each functional module comprises one or more learned parameters. Each functional module performs a respective image processing task. Each image processing task is selected from a list consisting of: black level correction, demosaicing, white balancing, sharpening, color correction, and tone map correction.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
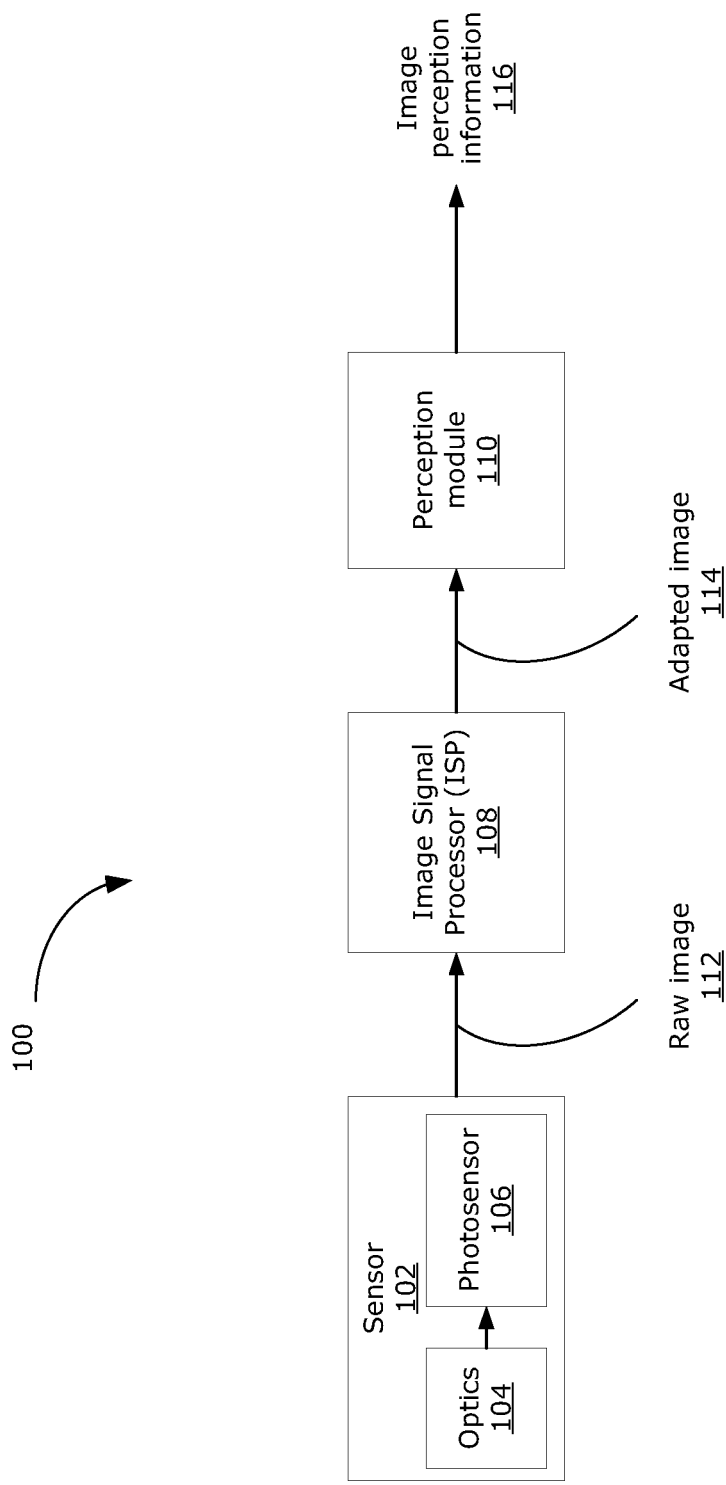
FIG. 1 (prior art) is a block diagram of an example machine vision system.

In examples disclosed herein, methods and systems are described that can be used to implement, train, and operate a differential image signal processor (ISP) to optimize the end-to-end performance of a machine vision system. The machine vision system may take the general form of the machine vision system 100 shown in FIG. 1: a sensor 102 feeding raw images to an imaging pipeline consisting of an ISP 108 and a perception module 110. In examples described herein, a conventional, hardware-based ISP is replaced with a differentiable ISP that can be trained using machine learning techniques, and specifically using unsupervised learning to train the ISP as the generator of a generative adversarial network (GAN). In some examples, the ISP is considered in isolation as a machine vision system. In other examples, the perception module 110 and/or the sensor 102 are also considered to be part of the machine vision system.

Hardware ISPs are used almost ubiquitously in vision systems due to their efficiency and real-time processing speed. However, the non-differentiability of the parameters defining the operation of hardware ISPs prevents a hardware ISP from being jointly optimized with the perception module in an end-to-end machine vision system. Moreover, existing approaches using differentiable approximations of hardware ISPs or heuristic differentiable ISP designs require fully supervised fine-tuning (i.e. supervised machine learning) which includes data capturing and annotation, which is typically performed by human beings. Examples described herein may solve these limitations through an efficient, differentiable ISP. Described examples may also address the harmful effects of visual domain shift due to changes in the sensor configuration, and consequently avoid the costs of generating labelled data, which is a significant hurdle in traditional end-to-end fine-tuning.

In traditional machine vision systems, the ISP and the perception module are designed separately. Examples described herein may instead provide an efficient, differentiable ISP, implemented as a machine learned model operating according to the values of a plurality of learned parameters, as a pre-processing block in the vision system. The differentiable ISP can be optimized jointly with the perception module to generate an end-to-end loss. Such an end-to-end machine vision system does not require a separate hardware ISP, which is generally a black box, difficult to optimize based on the end-to-end loss. The differentiability of the ISP described herein may assist helps in joint optimization of the ISP and the perception model 110 via gradient-based solvers. The differentiability of the ISP may also enable the use of adversarial domain adaptation to mitigate the harmful effects of domain shift (e.g., due to replacement or reconfiguration of the sensor 102) and consequently avoid the costs of generating labelled training data, which is inevitable in traditional end-to-end fine-tuning. Hence, some embodiments may train the ISP as the generator of a generative adversarial network (GAN), using unsupervised learning, to adapt raw images from the new sensor 102 to generate adapted image of a perception module-specific type (e.g., in a target red-green-blue (RGB) visual domain) which corresponds to the adapted images of large-scale dataset on which the downstream perception model 110 has been pre-trained. Thus, example end-to-end machine vision systems described herein may be adapted to optimize or improve end-to-end performance though a low-cost process which bypasses conventional fine-tuning and data labelling.

The drawings show various example embodiments of machine vision systems implemented as software instructions executable by a processor, computing systems configured to execute a machine visions system and/or train an ISP, and methods for training ISPs.

Figure 2:
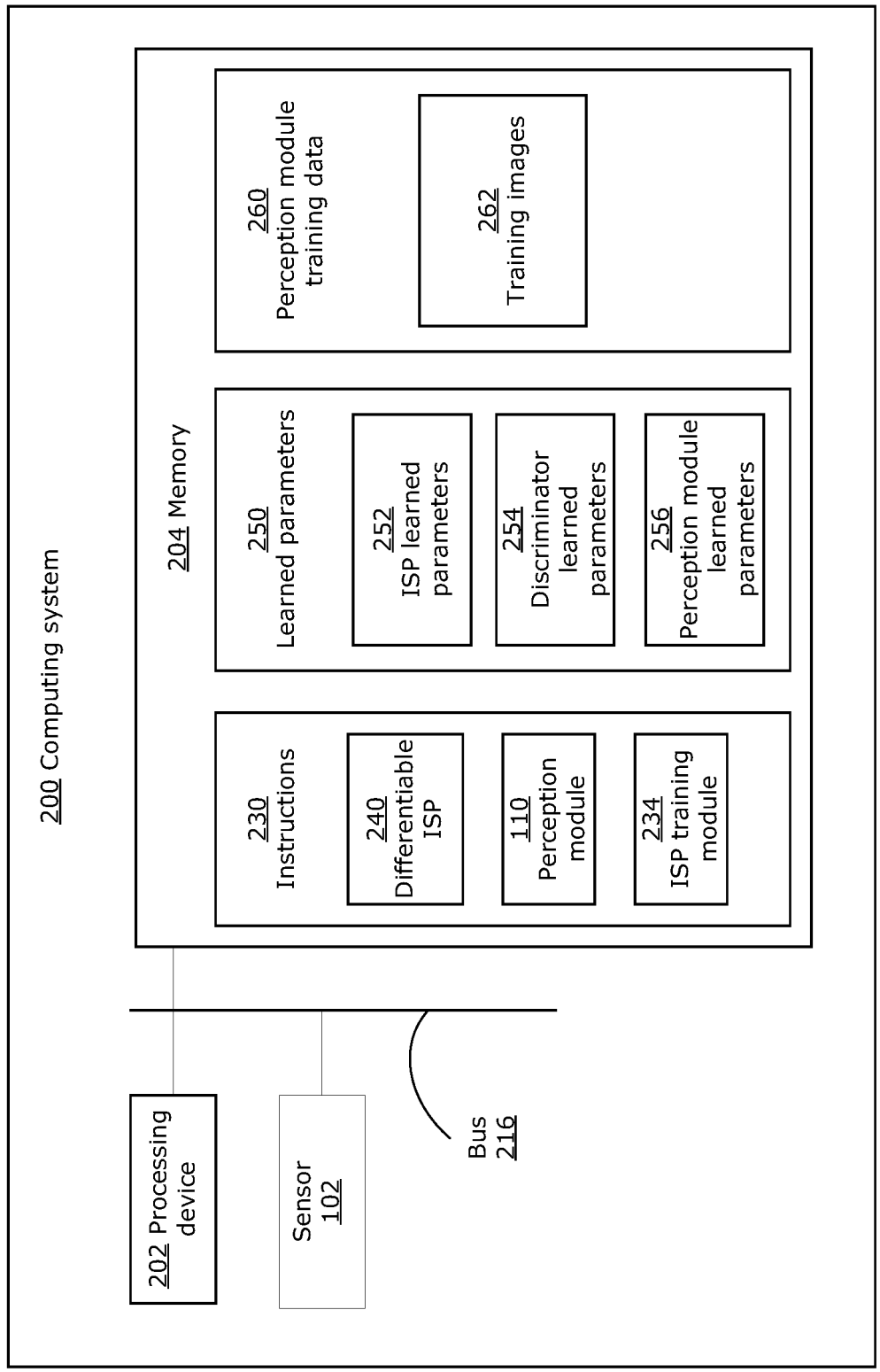
FIG. 2 is a block diagram of an example computing system suitable for implementing machine vision systems and training methods in accordance with examples described herein.

FIG. 2 is a block diagram illustrating a simplified example implementation of a computing system 200. Other examples suitable for implementing embodiments described in the present disclosure may be used, which may include components different from those discussed below. Although FIG. 2 shows a single instance of each component, there may be multiple instances of each component in the computing system 200.

The computing system 200 may include one or more processing devices, such as a processor, a microprocessor, a digital signal processor, an application-specific integrated circuit (ASIC), a field-programmable gate array (FPGA), a dedicated logic circuitry, a dedicated artificial intelligence processor unit, a tensor processing unit, a neural processing unit, a hardware accelerator, or combinations thereof. For ease of reference, the one or more processor 202 may be collectively referred to as a processor 202.

The computing system 200 may include one or more memories (which may be referred to collectively as a memory 204), which may include a volatile or non-volatile memory (e.g., a flash memory, a random access memory (RAM), and/or a read-only memory (ROM)). The non-transitory memory 204 may store processor executable instructions 230 for execution by the processor 202, such as to carry out examples described in the present disclosure, and potentially including instructions for implementing a differentiable ISP 240, a perception module 110, and/or an ISP training module 234, as described in greater detail below with reference to FIGS. 3-7. The memory 204 may also include other software stored as processor executable instructions 230, such as for implementing an operating system and other applications/functions. In some examples, the computing system 200 may additionally or alternatively execute instructions from an external memory (e.g., an external drive in wired or wireless communication with the computing system 200) or may be provided processor executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The memory 204 may also store learned parameter values for various trained models used by the examples described herein. These learned parameters may include ISP learned parameters 252, discriminator learned parameters 254, and perception module learned parameters 256. As described in greater detail below, the ISP learned parameters 252 may be used to control the behavior of the differentiable ISP after it has been trained. Before being trained, the learned parameters of the various models may be referred to as "learnable parameters"; thus, for example, before or during training the ISP learned parameters 252 are referred to as the ISP learnable parameters, and the discriminator learned parameters 254 are referred to as the discriminator learnable parameters. The learnable parameter values may be stored in the memory 204 during training. In addition to the learned parameters 252, 254, 256, each trained model described herein may also include other data, such as hyperparameter values. These may also be stored in the memory 204, for example as part of the instructions 230.

The memory 204 may also store perception module training data 260, including a dataset of training images 262. The training images 262 may be adapted images of a perception module-specific type, i.e. images in a specific visual domain, that were generated by an ISP based on raw images generated by the sensor that was used in initially training the perception module 110. The training images 262 may thus be used to train a differentiable ISP, as described below with reference to FIGS. 3-5, using unsupervised learning. Whereas the labels or other metadata associated with the training images 262 may be stored in the memory 204 as well, this metadata may not be necessary when training the differentiable ISP using unsupervised learning, as described below.

In some embodiments, the sensor 102 may be considered part of the computing system 200. In some embodiments, the sensor 102 may include optical components (e.g. optics 104) and photosensitive components (e.g. photosensor 106), as described above with reference to FIG. 1. The sensor 102 is configured to generate raw images of a sensor-specific type. As described below with reference to FIG. 4, in some examples the end to end machine vision system is initially trained using raw images generated by a first sensor (referred to herein as the "previous sensor"). The ISP is thus initially trained or configured to generate adapted images of the perception module-specific type based on received raw images of the previous sensor-specific type. The sensor is then replaced or reconfigured such that it constitutes a new sensor (also referred to herein as the "current sensor" or simply the "sensor" unless otherwise specified). A differentiable ISP is then trained to adapt raw images generated by the new sensor into the domain defined by the pre-existing adapted images of the perception module-specific type (i.e. the training images 262), using unsupervised learning as described below.

The components of the computing system 200 may communicate with each other via various means, such as a data bus 216. In some embodiments, the computing system 200 may be a distributed computing system, such as a cloud computing system or a virtual machine instance implemented over one or more servers.

Figure 3:
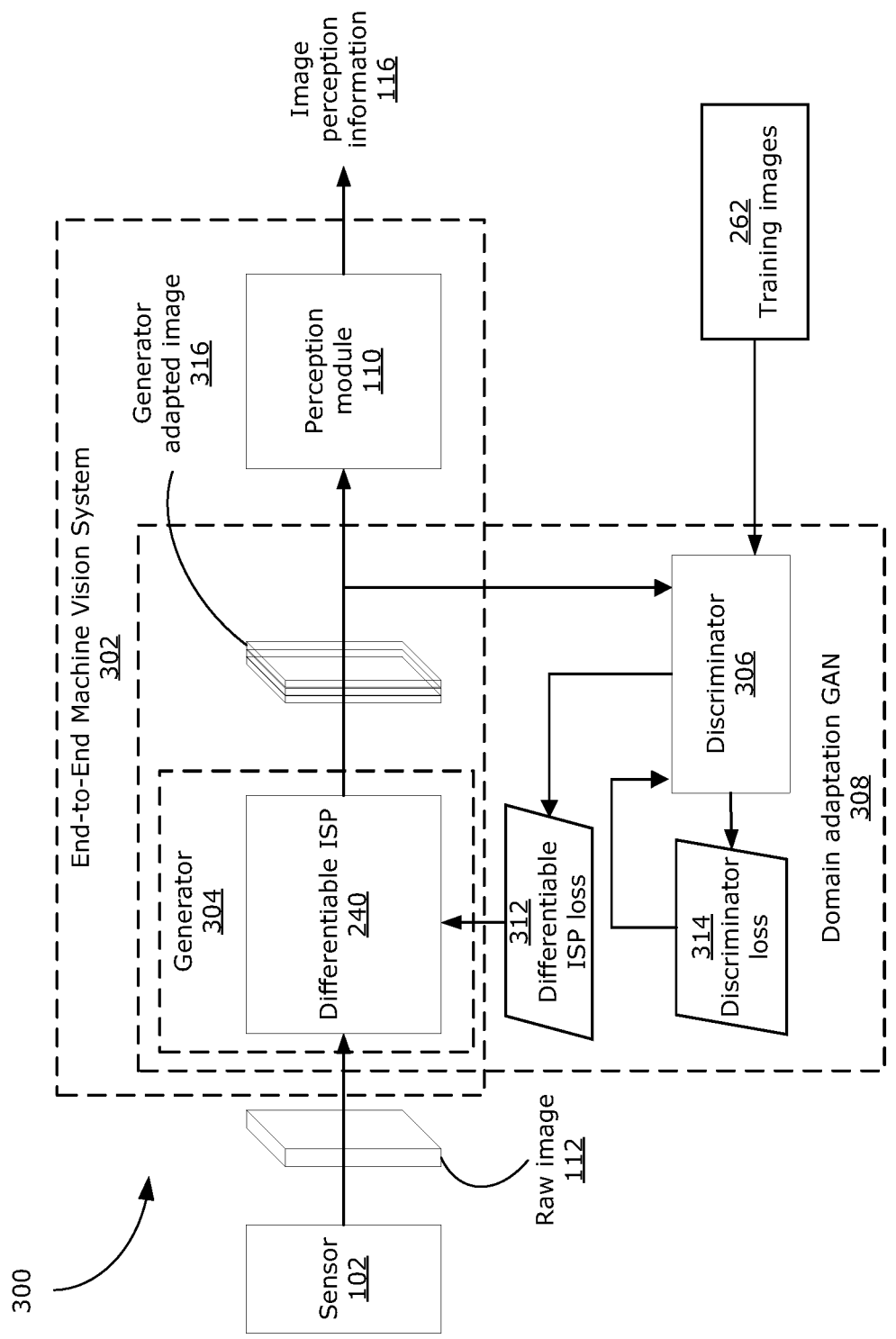
FIG. 3 is a block diagram of a domain adaptive generative adversarial network used to train a generator for use as a differentiable image signal processor of an end-to-end machine vision system in accordance with examples described herein.

FIG. 3 shows a generative adversarial network (GAN) used to train a differentiable ISP to adapt the raw images from a sensor 102 (e.g. the "new sensor") into a visual domain defined by the pre-existing adapted images of the perception module-specific type (i.e. the training images 262). The task for which the differentiable ISP is being trained in the GAN of FIG. 3 may thus be referred to as "GAN-based domain adaptation". A GAN is a machine learning structure that trains a first model, called a generator, to generate a specific type of output using a second model, called a discriminator, to provide feedback information to the generator with respect to the accuracy of its outputs. The discriminator itself is trained using a dataset of samples (e.g., images) that define a domain of the desired output of the generator. In this example, the visual domain of the raw images is defined by a sensor-specific raw image type (of, e.g., either a previous sensor or a new sensor), and the visual domain to which the raw images are being adapted is defined by the pre-existing adapted images of the perception module-specific type pre-existing adapted images of the perception module-specific type (i.e. the training images 262). The specific image signal processing and enhancement operations performed by the ISP to adapt the raw images to the visual domain of the training images 262 are described in greater detail below with reference to the example differentiable ISPs of FIGS. 6-7.

The domain adaptation GAN 308 shown in FIG. 3 includes a generator 304, consisting of a differentiable ISP 240, and a discriminator 306, which may be implemented in some embodiments as a general purpose contracting convolutional neural network configured to perform a binary classification task on received images. When a new sensor 102 is installed or reconfigured, visual domain shift may result due to changes to the sensor-specific type of the raw images 112. In response to such visual domain shifts, the GAN 308 may be trained by the ISP training module 234 (not shown in FIG. 3) during an ISP training phase to adapt the new raw image type to the visual domain of the training images 262. When the ISP training phase is complete, the differentiable ISP 240 may deployed for operation as part of an end to end machine learning system 302 comprising the differentiable ISP 240 and the pre-trained perception module 110. In some examples, the ISP learned parameters 252 and/or other information defining the operation of the differentiable ISP 240 may be stored on a non-transitory processor-readable medium and distributed for installation on devices or computing system using the sensor 102 (i.e. the new sensor), to replace previous ISP parameters. This may provide advantages in terms of the ease of optimizing the end to end machine vision system 302 operating on a device or computing system following a change to the optical and/or photosensitive hardware of the device or computing system.

The goal of the unsupervised learning process performed during the ISP training phase is to learn a set of parameters for a differentiable ISP function (denoted as ISP(.)), which maps raw images 112 (denoted as x) of the sensor-specific type to the visual domain defined by the perception module-specific type of the training images 262 (denoted as y). The discriminator 306 is trained to apply an objective function (denoted as D(.)) to distinguish between training images 262 y and generator adapted images 316 (denoted as ISP(x)) generated by the differentiable ISP 240 based on the raw images 102. The objective function contains two types of terms: adversarial loss (denoted as $\mathcal{L}_{adversarial}$) and Kullback-Leibler divergence (denoted as $D_{KL}(.)$). The adversarial loss includes a discriminator loss 314 (denoted as $\mathcal{L}_D$) used to train the discriminator 306:

$$\mathcal{L}_D = (\mathbb{E}((1-D(y))^2) + \mathbb{E}(D^2(ISP(x)))), \quad (1)$$

and a generator loss 312 (denoted as $\mathcal{L}_{ISP}$) used to train the generator 304:

$$\mathcal{L}_{ISP} = \omega_1 \mathcal{L}_{adversarial} + \omega_2 \mathcal{L}_{KL}, \quad (2)$$

wherein $\mathcal{L}_{adversarial} = \mathbb{E}((1-D(ISP(x)))^2)$ and $\mathcal{L}_{KL} = D_{KL}(px \| py)$. Thus, the discriminator 306 receives training images 262 from the training data set (i.e. perception module training data 260) and generator adapted images 316 generated by the differentiable ISP 240, generates binary classification information for the two types of image by performing the binary classification task, and generates the discriminator loss 314 and generator loss 312 based on the binary classification data. The ISP training module 234 (not shown in FIG. 3) uses the discriminator loss 314 and generator loss 312 to train the generator 304 and the discriminator 306, as described below with reference to FIGS. 4-5. After the generator 304 has been trained, the differentiable ISP 240 may be used to adapt raw images 112 into adapted images (i.e. generator adapted images 316) as part of the end to end machine vision system 302 along with the perception module 110, thereby generating perception information 116 as a result of the perception task performed by the perception module 110 on the generator adapted images 316. In FIG. 3, the generator adapted images 316 are shown as RGB images having three color channels (red, green, and blue).

The discriminator loss 314, along with any other information generated by the discriminator 306 that is used by the ISP training module 234 to train the discriminator 306, may be referred to herein as discriminator loss information. Similarly, the generator loss 312, along with any other information generated by the discriminator 306 that is used by the ISP training module 234 to train the generator 304, may be referred to herein as differentiable ISP loss information (or generator loss information).

In some embodiments, the end to end machine vision system 302 may be considered to include the sensor 102.

Figure 4:
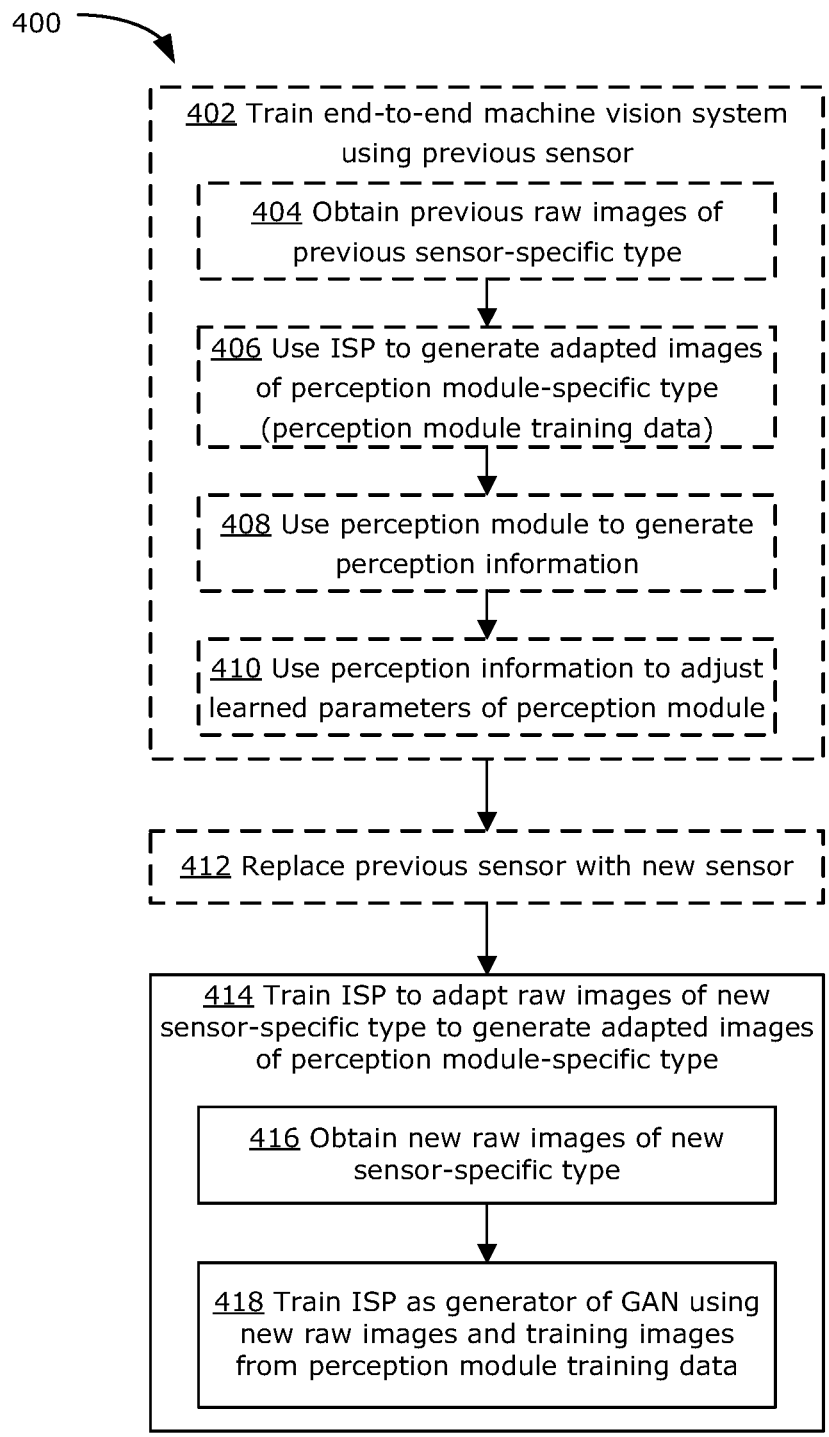
FIG. 4 is a flowchart showing steps of an example method for training an end-to-end machine vision system to perform an image perception task with a previous sensor, and then with a new sensor, in accordance with examples described herein.

FIG. 4 shows an example method 400 for training an end-to-end machine vision system 302 to perform an image perception task with a previous sensor, and then with a new sensor 102. The method 400 includes three high-level operations: at operation 402, training the end-to-end machine vision system 302 using the previous sensor; at operation 412, replacing the previous sensor with the new sensor 102; and at operation 414, training the ISP to adapt raw images 112 of the new sensor-specific type to generate adapted images of the perception module-specific type (i.e., GAN adapted image 316 generated by the trained generator 304). The present disclosure described operations 412 and 414 simply for the sake of context; operation 414, and the trained differentiable ISP 240 generated thereby, are the focus of the present disclosure, and operations 412 and 414 may be performed using any of a number of existing techniques. Operations 412 and 414 may therefore be considered optional, as indicted in FIG. 4 by dashed lines.

Operation 402 includes four sub-steps: 404, 406, 408, and 410. At 404, the machine vision system (e.g. end-to-end machine vision system 302) obtains a plurality of raw images from a sensor (i.e. the previous sensor). The raw images are of a previous sensor-specific type, i.e. are in a visual domain defined by the configuration of the previous sensor. At 406, the machine vision system uses an ISP to generate adapted images of a perception module-specific type, i.e. the training images 262. These training images 262 are annotated with labels or other metadata, typically by humans, to generate the perception module training data 260. At 408, the perception module 110 processes the training images 262 to perform the perception task (i.e. forward propagation), thereby generating the perception information 116. At 410, the perception information 116 is compared to the labels or other metadata of the perception module training data 260, and the perception module learned parameters 256 are adjusted based on the result of the comparison (i.e. back propagation).

Operation 402 as described above assumes a perception module 110 implemented as a machine learned model, such as a convolutional neural network, that is trained by supervised learning. However, it will be appreciated that other machine learning techniques may be used to design and train the perception module 110 in some embodiments, as long as they are trained using a dataset of training images 262 that are retained for later use in training the differentiable ISP 240.

At 412, the previous sensor is reconfigured or replaced, such that the raw images provided to the end-to-end machine vision system 302 are now raw images of a different sensor-specific type from those used to perform the initial training of the end-to-end machine vision system 302 at operation 402. It will be appreciated that replacing the sensor 102 at operation 412 is not restricted to actually replacing or changing hardware on a single device; for example, a software-based perception module 110 trained in one context may be copied and executed on a different device having a different sensor 102 from the device used to train the perception module 110, and this would be functionally equivalent to the sensor 102 being replaced on the device used to train the perception module 110.

At 414, an ISP (e.g., the differentiable ISP 240) is trained to adapt raw images, of the sensor-specific type generated by the new sensor 102, to generate adapted images of the perception module-specific type, i.e. of the same image type as the training images 262. A detailed example method 500 for training a differentiable ISP, corresponding to operation 414, is described below with reference to FIG. 5; however, in general terms, operation 414 includes two sub-steps, 416 and 418. At 416, the machine vision system obtains a plurality of raw images 112 from the sensor 102 (i.e. the new sensor). The raw images are of the sensor-specific type, i.e. are in a visual domain defined by the configuration of the new sensor 102. At 418, the ISP is trained as the generator of a GAN using the plurality of raw images 112 and a plurality of the training images 262 from the perception module training data 260.

Figure 5:
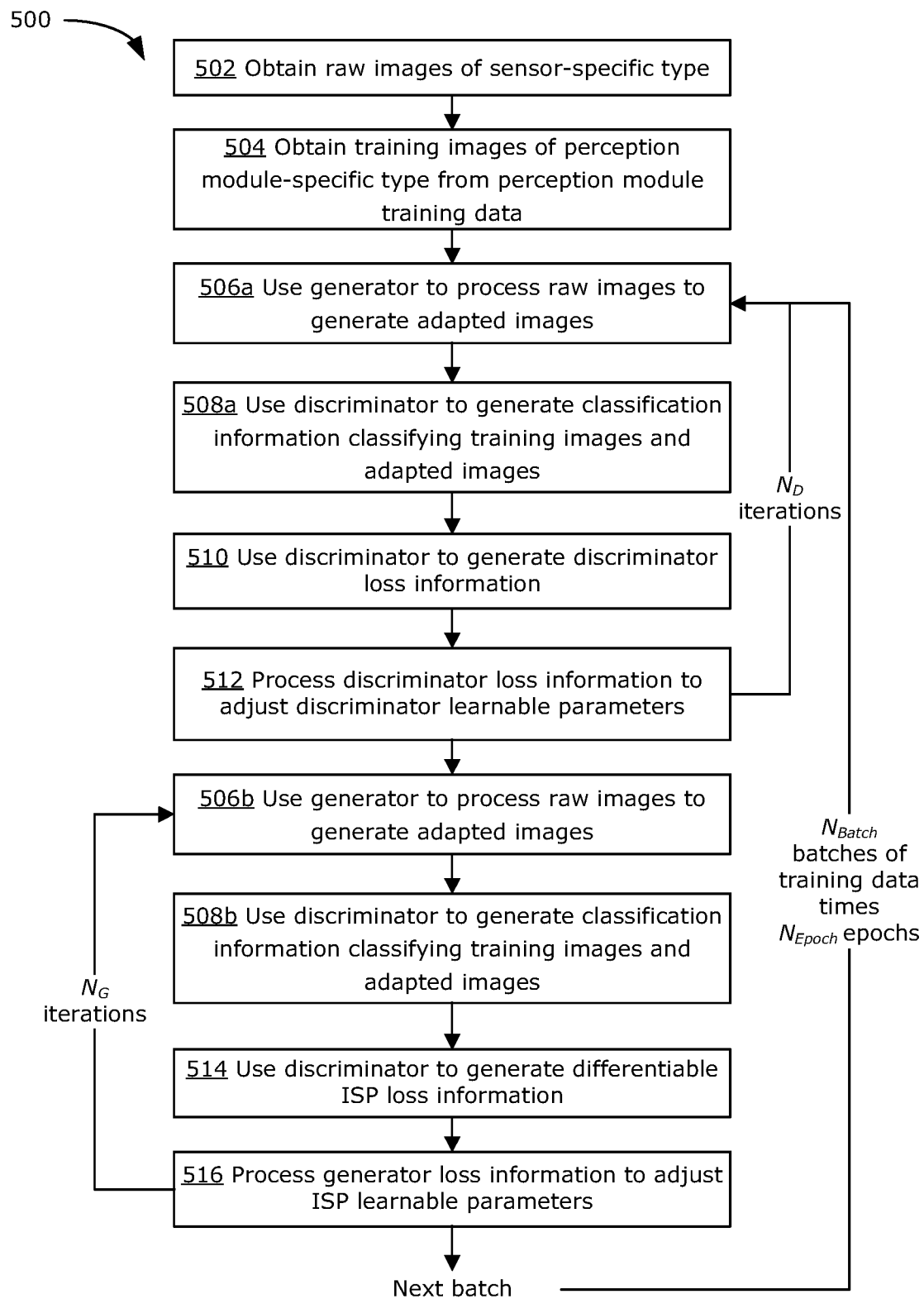
FIG. 5 is a flowchart showing steps of an example method for training a differentiable image signal processor to adapt raw images from a sensor in accordance with examples described herein.

FIG. 5 shows an example method 500 for training a differentiable image signal processor 240 to adapt raw images 112 from a sensor 102. Method 500 is a more detailed version of operation 414 of method 400.

Method 500 allows a machine vision system to benefit from a pre-trained perception module 110 without the need to fine-tune the perception module 110 to perform in a new hardware context (i.e. using a different sensor 102 than the sensor used to train the perception module 110). Given a perception module 110 and its pre-trained perception module learned parameters 256 (denoted as $w_{cv}$, indicating a set of weights), designing and deploying the end-to-end machine vision system 302 consists of two phases: an ISP training phase, and an inference phase. The ISP training phase is described above with reference to FIG. 3 and comprises the steps of method 500 described below. After the differentiable ISP 240 has been trained during the training phase, the end-to-end machine vision system 302 can be operated to perform the perception task during the inference phase, using the trained differentiable ISP 240, with its ISP learned parameters 252 (denoted as $w_{ISP}$) adjusted to a set of trained values to optimize or improve end-to-end performance of the end-to-end machine vision system 302.

Returning to FIG. 5, the operations of the method 500 are performed by the ISP training module 234 executed by the processor 202, using the domain adaptation GAN 308 architecture shown in FIG. 3. The method 500 iterates over a plurality of batches of the ISP training dataset (i.e. the raw images 112 generated by the sensor 102, and the training images 262), as described in further detail below.

At 502, the differentiable ISP 240 obtains a plurality of raw images 112 from the sensor 102. The raw images 112 are of the sensor-specific type, as described above, which may be different from the previous sensor-specific type of the raw images used to perform the initial training of the end-to-end machine vision system 302 (e.g., at operation 402 of method 400).

At 504, the differentiable ISP 240 obtains a plurality of training images 262. As described above, the training images 262 have been used to train the perception module 110 to perform the image perception task, and the training images are therefore considered to be of a perception module-specific type (i.e. they are in the visual domain on which the perception module 110 has been trained).

At 506a, as described above with reference to FIG. 3, the differential ISP 240 (i.e. the generator 304 of the domain adaptation GAN 308) is used to process the raw images 112 to generate generator adapted images 316. It will be appreciated that, at the beginning of the ISP training phase, the untrained, non-initialized differentiable ISP 240 will have its ISP learned parameters 252 set to random values, resulting in it generating generator adapted images 316 that have had essentially random image processing or image enhancement operations performed on them, and that are therefore unlikely to match the visual domain of the training images 262. However, as method 500 iterates over a large dataset, the differentiable ISP 240 is trained to generate generator adapted images 316 that are closer and closer to the visual domain of the training images 262.

At 508a, the discriminator 306 is used to generate classification information (e.g. binary classification data as described above with reference to FIG. 3) classifying the generator adapted images 316 and training images 262. For example, the discriminator 306 may predict a classification of each GAN adapted image 316 and each training adapted image 262 as either "valid" or "invalid", wherein "valid" is a prediction that the image is in the visual domain of the training images 262. Again, it will be appreciated that the classifications of the discriminator 306 are essentially random at the beginning of the ISP training phase, but improve as method 500 iterates over a large dataset.

Method 500 then performs operations in one of two modes: a first mode, in which the discriminator 306 is trained, and a second mode, in which the generator 304 is trained. The method 500 may operate in the first mode for one or more iterations, the number of iterations denoted by the variable $N_D$, followed by operation in the second mode for one or more iterations, the number of iterations denoted by the variable $N_G$. The method 500 then returns to operation 506a to train the GAN using the next batch of ISP training data (i.e. the raw images 112 generated by the sensor 102, and the training images 262).

In the first mode, the method 500 performs operations 510 and 512. At 510, the discriminator 306 is used to generate a discriminator loss 314 (and any other discriminator loss information) as described above with reference to FIG. 3. At 512, the ISP training module 234 processes the discriminator loss information to adjust the discriminator learned parameters 254, thereby training the discriminator 306. The method 500 then returns to operation 506a until a total of $N_D$ iterations have been performed in the first mode (operations 510 and 512).

When $N_D$ iterations have been performed in the first mode, the method 500 proceeds to operation 506b, which is identical to operation 506a, and operation 508b, which is identical to operation 508a. The method 500 then proceeds to operation 514. At 514, the discriminator 306 is used to generate a generator loss 312 (and any other differentiable ISP loss information) as described above with reference to FIG. 3. At 516, the ISP training module 234 processes the differentiable ISP loss information to adjust the ISP learned parameters 252, thereby training the differentiable ISP 240 to perform as a generator 304. The method 500 then returns to operation 506b until a total of $N_G$ iterations have been performed in the second mode (operations 514 and 516).

When $N_G$ iterations have been performed in the second mode, the method 500 returns to operation 506a to repeat the process on the next batch of ISP training data. The method 500 continues this behavior until all batches of training data have been used to train the domain adaptation GAN 308. The method 500 may then start again, performing the entire method 500 (or at least steps 506a onward) for one or more additional training epochs after the entire set of ISP training data has been used for the first epoch of training. The number of batches of ISP training data may be denoted as $N_{Batch}$; the number of training epochs may be denoted as $N_{Epoch}$.

In computing of the adversarial loss $\mathcal{L}_{adversarial}$ for the domain adaptation GAN 308, $\mathcal{L}_{KL}=D_{KL}(px\|py)$ may be calculated by fitting a Gaussian distribution to the raw images 112 (i.e. x) as px and fitting a Gaussian distribution to the generator adapted images 316 (i.e. y) as py. Optimization is performed using back-propagation, due to the use of a convolutional neural network as the discriminator 306 in the described examples. The use of back-propagation is typically only possible if the ISP is differentiable, i.e. if it is a differentiable ISP 240.

Thus, method 500 may be used to train the generative adversarial network (e.g. domain adaptive GAN 308), comprising a generator 304 and a discriminator 306, to process further raw images of the sensor-specific type (i.e. raw images 112) to generate further adapted images of the perception module-specific type (i.e. generator adapted images 316), using the plurality of training images 262 and the plurality of raw images 112. The generator 304 is used to process the raw images 112 to generate the generator adapted images 316. The discriminator 306 is used to classify the training images 262 and generator adapted images 316, thereby generating classification information. The discriminator 306 is used to generate discriminator loss information (e.g. discriminator loss 314) and differentiable ISP loss information (e.g. generator loss 312) based on the classification information. The differentiable ISP loss information is processed (e.g. by the ISP training module 234) to adjust a plurality of learned parameters of the generator (i.e. ISP learned parameters 252), and the discriminator loss information is processed (e.g. by the ISP training module 234) to adjust a plurality of learned parameters of the discriminator (i.e. discriminator learned parameters 254).

The ISP training method 500 may operate by repeating, one or more times, a first mode, followed by repeating, one or more times, a second mode. In the first mode, the discriminator loss information is generated, and the discriminator loss information is processed to adjust the plurality of learned parameters of the discriminator. In the second mode, the differentiable ISP loss information is generated, and the differentiable ISP loss information is processed to adjust the plurality of learned parameters of the generator.

Figure 6:
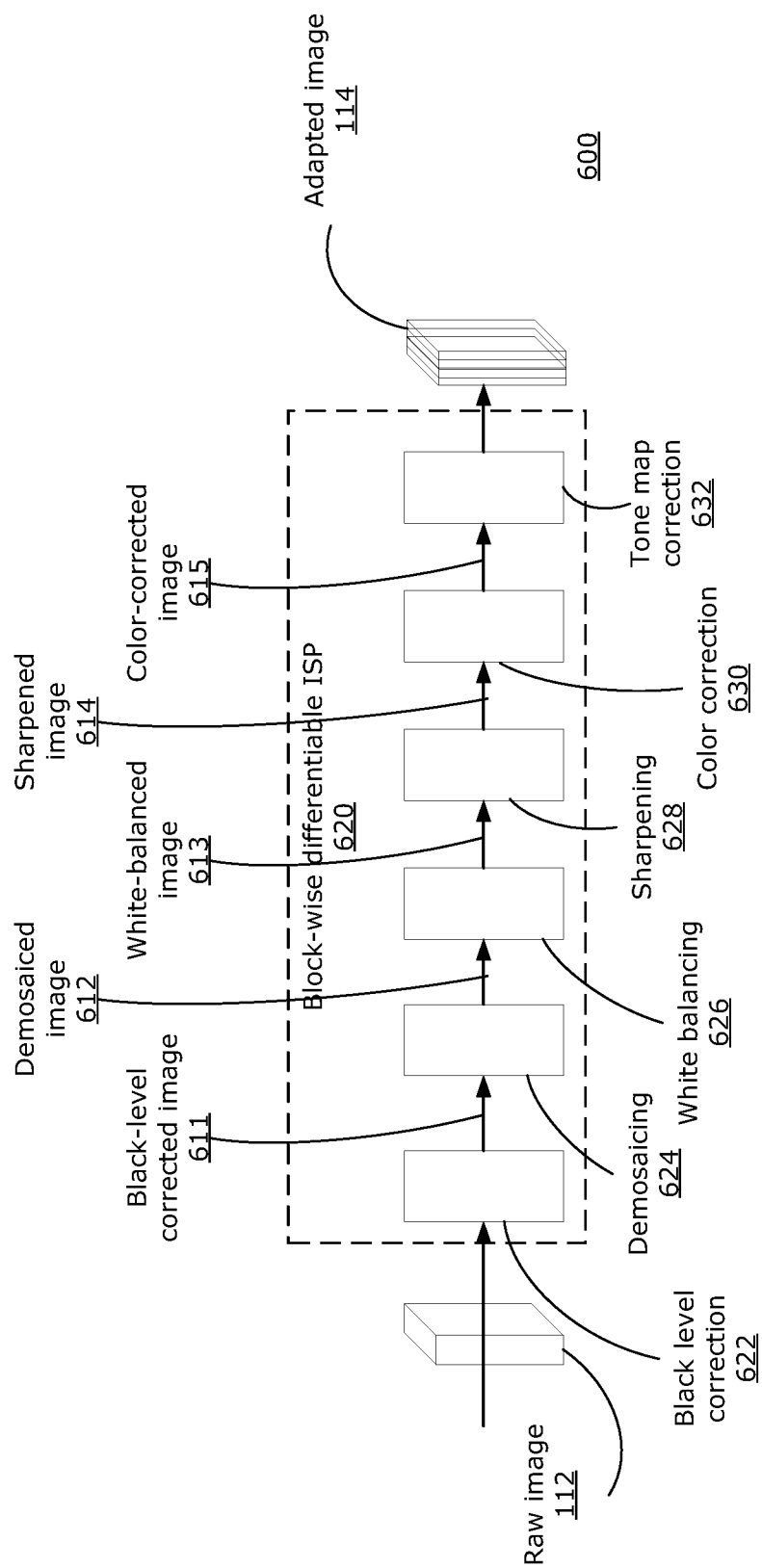
FIG. 6 is a block diagram of an example block-wise differentiable image signal processor in accordance with examples described herein.
Figure 7:
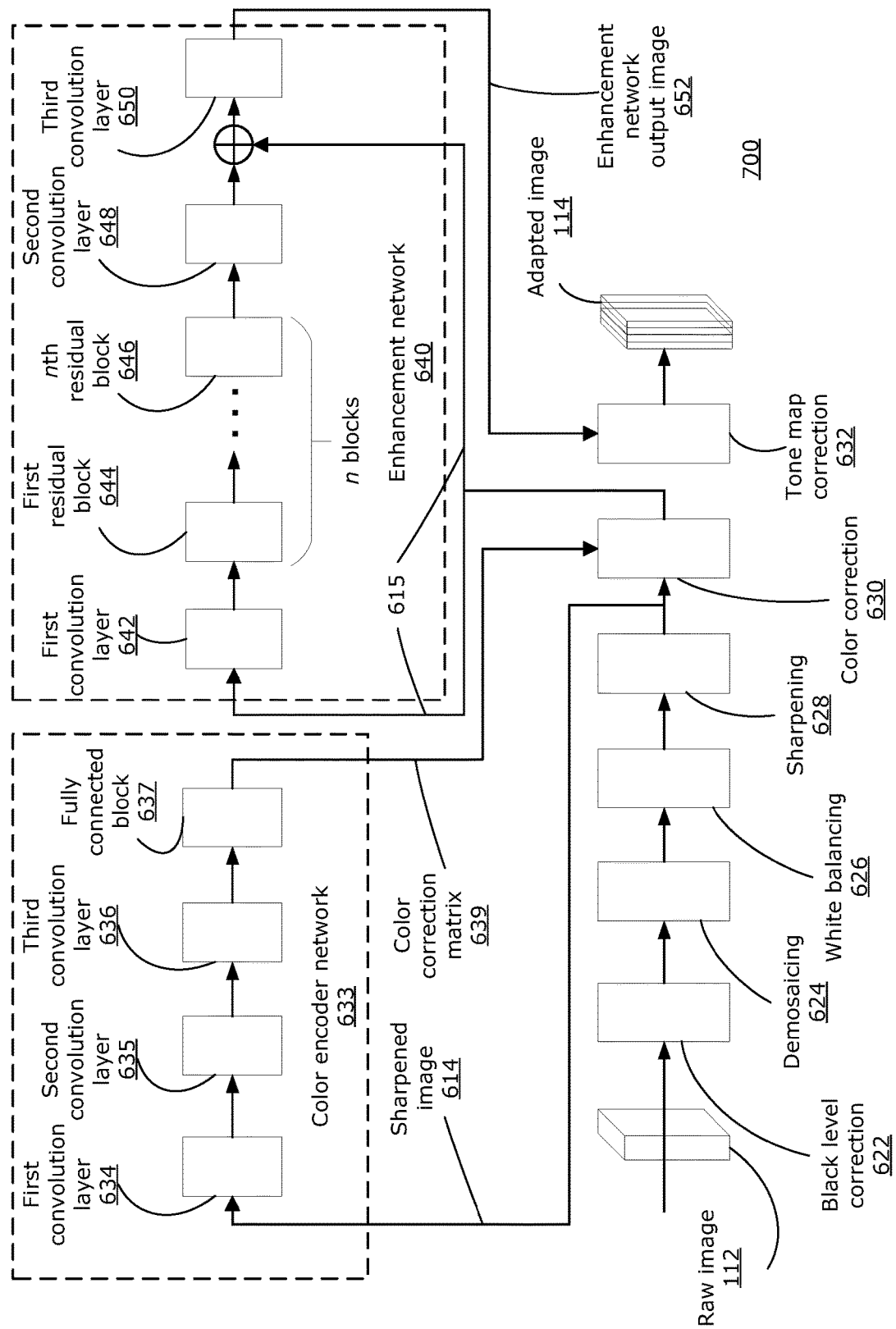
FIG. 7 is a block diagram of an example block-wise differentiable image signal processor including an enhancement network and a color encoder network in accordance with examples described herein.

Example embodiments of the differentiable ISP 240 are now described, with reference to FIG. 6 and FIG. 7.

The discretized radiometric process of a sensor 102 to form a raw image in the form of a vectorized two dimensional array x from an observed scene 1 can be modeled as:

$$x = \min(b + S(C \otimes I)KI + n, w) \quad (3)$$

wherein $I = [I_R^T \ I_G^T \ I_B^T]^T$ denotes the latent scene image, $S = [S_R \ S_G \ S_B]$ denotes sensor mosaicking sampling operators, and $K = \text{diag}(K_R, K_G, K_B)$ denotes intrinsic lens blur functions in red, green, and blue color bands, denoted by R, G, and B subscripts respectively. In this model, a random noise vector is denoted by n, the black level offset of the sensor is denoted by b, and the maximum pixel intensity level (i.e., white level) is denoted by w. Finally, the color degradation is modeled with a 3×3 color modification matrix denoted by C. For an n×n resolution sensor, the Kronecker product ($\otimes$) of C and an identity matrix I whose order is n is needed in the imaging model expressed in Equation 3 above. (The lowercase bold symbols denote vectors, and the uppercase bold symbols denote matrices in Equation 3.)

The function of an ISP in a machine vision system is to reverse the image formation process corresponding to Equation 3 above to restore the latent high-resolution image for further processing by the machine vision system (e.g., by the perception system 110). In theory, the differentiability of an ISP can be preserved once it is implemented by using models having a large number of learned parameters, such as neural networks. However, ISPs represented by neural networks are over-parameterized and too inefficient, in terms of processing and memory resources, to be used along with another large neural network such as the perception module 110. Therefore, example differentiable ISPs 240 described herein provide an efficient block-wise differentiable ISP whose processing blocks (also called functional modules) perform reconstruction of the image through inverting the imaging operations introduced in Equation 3.

For the sake of brevity, the input image and the output image of each functional module may be denoted by x and $\hat{x}$ respectively in the description of the ISPs of FIGS. 6-7. However, it will be appreciated that x and $\hat{x}$ are different from one functional module to another.

FIG. 6 shows an example block-wise differentiable image signal processor (ISP) 600. In some examples, the block-wise differentiable ISP 600 is a generator trained in accordance with the ISP training method 500.

The block-wise differentiable ISP 600 includes a plurality of functional modules. Each functional module comprises a respective subset of the ISP learned parameters 252, and each functional module performs a respective image processing task, which may include black level correction, demosaicing, white balancing, sharpening, color correction, and/or tone map correction.

In the example shown in FIG. 6, the plurality of functional modules are a black level correction module 622, a demosaicing module 624, a white balancing module 626, a sharpening module 628, a color correction module 630, and a tone map correction module 632.

The black level correction module 622 processes the raw images to generate black-level corrected images 611 based on ISP learned parameters 252 including a black value b and a white value w. In order to compensate for the thermally generated voltage on the sensor 102, the sensor measurement has an offset. This reference voltage, which is called black-level b, is subtracted from the image signal as $\hat{x} = (x-b)/(w-b)$, wherein w denotes the maximum intensity value measured by the sensor 102. It will be appreciated that the input raw image x is normalized, and its pixel values are in the range of 0 to 1. Therefore, the intrinsic constraints of the black-level correction block are $0 \leq b < w \leq 1$.

The demosaicing module 624 processes the black-level corrected images 611 to generate demosaiced images 612 by performing color-channel filtering based on several ISP learned parameters 252. A first set of the ISP learned parameters 252 consists of three low-pass filters $h_R$, $h_G$, $h_B$ corresponding to three color channels of the black-level corrected images 611, each low-pass filter comprising four scalar learned parameter values (i.e. a 2×2 matrix of scalar parameter values). A second set of the ISP learned parameters 252 consists of three scalar weight factors $s_\gamma$, $s_\beta$, $s_\alpha$ for controlling inter-channel correlation of high-frequency characteristics. Raw pixel values of the raw image 112 are typically formed using a color filter array sensor with a Bayer mosaic pattern. Trichromatic (i.e., RGB) pixel values are reconstructed from the mosaicked raw image data. The demosaicing process to reconstruct each color channel can be considered as a binary interpolation of the channel combined with high-frequency details that exist in the other two channels. This can be modeled through at least 6 unique filtering processes performed for the 6 following cases:

Red pixel at green location: $\hat{x}_R = h_R * x_R + s_\beta \Delta x_G$
Red pixel at blue location: $\hat{x}_R = h_R * x_R + s_\gamma \Delta x_B$
Blue pixel at green location: $\hat{x}_B = h_B * x_B + s_\beta \Delta x_G$
Blue pixel at red location: $\hat{x}_B = h_B * x_B + s_\gamma \Delta x_R$
Green pixel at red location: $\hat{x}_G = h_G * x_G + s_\alpha \Delta x_R$
Green pixel at blue location: $\hat{x}_G = h_G * x_G + s_\alpha \Delta x_B$ wherein $h_R$, $h_G$, $h_B$ denote the 2×2 low-pass filters, which are convolved with the corresponding color channel to perform inter-channel interpolation. In the above cases, A denotes the Laplacian operator, which extracts high-frequency details of the channels. In these cases, the correlation of the reconstructed channel and the high-frequency details of the other two channels is controlled with the weight factors $s_\gamma$, $s_\beta$, $s_\alpha$. Hence, the learning parameters have the following constraints:

$0 \leq s_\gamma \leq 1$, $0 \leq s_\beta \leq 1$, $0 \leq s_\alpha \leq 1$, $\|h_R\|_1 = 1$, $\|h_G\|_1 = 1$, $\|h_B\|_1 = 1$, and each element of $h_R$, $h_G$ and $h_B$ is non-negative.

The white balancing module 626 generates white-balanced images 613 by applying gain to each of the three color channels of the demosaiced images 612 based on ISP learned parameters 252 comprising three gain values $g_R$, $g_G$, $g_B$. Due to the difference between the sensor's 102 spectral sensitivity and that of the human vision system, the output of the sensor 102 needs to be color corrected. This is done in two different stages in the ISP: the white balancing module 626 and the color correction module 630, described below. The white balancing module 626 applies some gains to the color channels as $\hat{x}_R = g_R x_R$, $\hat{x}_G = g_G x_G$, $\hat{x}_B = g_B x_B$.

The sharpening module 628 generates sharpened images 614 by deblurring each color channel of the white-balanced images 613 in the frequency domain based on ISP learned parameters 252 comprising three deblurring matrices $k_R$, $k_G$, $k_B$ corresponding to the three color channels. Each deblurring matrix $k_R$, $k_G$, $k_B$ may be implemented as a matrix having no more than 100 scalar learned parameters. In some embodiments, the deblurring matrices $k_R$, $k_G$, $k_B$ are each a 5×5 matrix of scalar ISP learned parameters 252.

Due to dispersion and also the miss-alignment of the sensor plane, there is always some degree of blur in the image captured by the sensor 102. This blur is represented by a point spread function for each channel, denoted by $k_R$, $k_G$, $k_B$ convolved with the respective color channels red, green, blue. The blur effect is compensated through a Wiener process which is a solution to a least squares problem with a Gaussian distribution of the noise as the prior. The sharpening module 638 performs this deburring process in the frequency domain as:

$$\hat{x}_R = IFFT\left(\frac{FFT(x_R) \cdot FFT(k_R)}{(FFT(k_R))^* \cdot FFT(k_R) + \lambda}\right)$$

$$\hat{x}_G = IFFT\left(\frac{FFT(x_G) \cdot FFT(k_G)}{(FFT(k_G))^* \cdot FFT(k_G) + \lambda}\right)$$

$$\hat{x}_B = IFFT\left(\frac{FFT(x_B) \cdot FFT(k_B)}{(FFT(k_B))^* \cdot FFT(k_B) + \lambda}\right)$$

wherein $\lambda$ denotes the signal to noise ratio, and FFT(.) and IFFT(.) denote the Fourier transform and inverse Fourier transform functions respectively. Hence, the intrinsic constraints of the ISP learned parameters 252 are as $\|k_R\|_1 = 1$, $\|k_G\|_1 = 1$, $\|k_B\|_1 = 1$, with non-negative values in $k_R$, $k_G$ and $k_R$. Also, for the noise parameter, $0 < \lambda \leq 1$.

The color correction module 630 generates color-corrected images 615 by applying a color correction matrix to the three color channels of the sharpened images 614, the color correction matrix being a three-by-three matrix comprising nine scalar color correction learned parameters, c1 through c9, of the ISP learned parameters 252. The 3×3 color correction matrix is applied to the sharpened image 614 as:

$$\begin{bmatrix} \hat{x}_R \\ \hat{x}_G \\ \hat{x}_B \end{bmatrix} = \begin{bmatrix} c1 & c2 & c3 \\ c4 & c5 & c6 \\ c7 & c8 & c9 \end{bmatrix} \begin{bmatrix} x_R \\ x_G \\ x_B \end{bmatrix}.$$

These parameters c1 through c9 are learned in a training process (e.g., method 500) wherein their intrinsic constraints need to be preserved as c1+c2+c3=1, c4+c5+c6=1, c7+c8+c9=1 and $0 < g_R$, $0 < g_G$, $0 < g_B$. In some embodiments, as described below with reference to FIG. 7, the parameters c1 through c9 may not be learned directly, but may instead be generated by a machine learned model called a color encoder network.

The tone map correction module 632 generates the generator adapted images 316 by applying gamma correction and sigmoid curve remapping the color-corrected images 615, based on three ISP learned parameters 252. First, a low-intensity curve parameter $\gamma 1$ for determining a curve to be applied to low-intensity pixels. Second, a high-intensity curve parameter $\gamma 2$ for determining a curve to be applied to high-intensity pixels. Third, a knee parameter k for determining a threshold between low-intensity pixels and high-intensity pixels. The image is tone mapped to enhance contrast via global histogram manipulation and for display using gamma or sigmoid curve remapping. The tone map correction module 632 performs the power law known as gamma correction and applies a sigmoid-like function. The combination of the two functions is controlled through the three parameters:

$$\hat{x} = x^{a/2.2}, \quad a = \frac{1 - (1 - \gamma 2)x^{1/\gamma 1}}{\gamma 2 \left(1 - (1 - \gamma 2)k^{1/\gamma 1}\right)}$$

wherein $\gamma 1$ determines a curve to be applied on the low intensity pixels, $\gamma 2$ determines a curve to be applied on the high intensity pixels, and k is a knee value denoting the border of the low intensity and high intensity pixels. The tone map parameters are constrained as $1 \leq \gamma 1$, $0 \leq \gamma 2 \leq 1$, $0 < k < 1$.

It will be appreciated that, in some embodiments, different ISP learned parameters may be used by the various functional modules of the block-wise differentiable ISP 600. Some embodiments may use matrices of different sizes from those described, thereby resulting in more or fewer total scalar learned parameters controlling the behavior of the generator 304. In the example described above, the total number of scalar values for the ISP learned parameters 252 controlling the behavior of the block-wise differentiable ISP 600 is 108. In other embodiments, the number of scalar values for the ISP learned parameters 252 may be fewer than 500, or fewer than 1000. It will be appreciated that any of these alternative configurations is still several orders of magnitude smaller than a typical deep neural network used for image processing, which may contain millions of learned parameters. This relatively small number of parameters avoids the problems associated with such large machine learned models described above, such as inefficiency in operation (i.e. during inference phase operations), difficulty in training, and overfitting to the training data. Efficient operation of the ISP may be of particular importance when operating jointly with the perception module 110, which is typically a large and over-parameterized convolutional neural network. Thus, the block-wise differentiable ISP 600 can potentially be used to replace the hardware ISPs that are traditionally used in machine vision systems.

Furthermore, the training process (e.g. method 500) of the block-wise differentiable ISP 600 is a semi-supervised learning process which addresses the visual domain shift caused by the sensor specifications of the machine vision system. Unlike fully supervised training or fine-tuning, the ISP training method 500 does not require the costly annotation and labelling of the training data (e.g., localizing the object pixels in the training set for a segmentation task, or identifying the object boundaries in the training set for an object detection task). The ISP training method 500 may be used to train the block-wise differentiable ISP 600, operating to optimize a set of ISP learned parameters denoted as:

$w_{ISP}=\{b, w, s_\alpha, s_\beta, h_R, h_G, h_B, s_\gamma, g_R, g_G, g_B, k_R, k_G, k_B, \lambda, c1, \ldots, c_9, k, \gamma1, \gamma2\}$.

In some embodiments, portions of the block-wise differentiable ISP 600 can be expanded to leverage some of the capabilities of larger machine learned models, potentially gaining in accuracy in exchange for some loss of efficiency. An example of such an expanded block-wise differentiable ISP is shown in FIG. 7.

FIG. 7 shows a second example block-wise differentiable ISP 700 including an enhancement network 640 and a color encoder network 633. In the second block-wise differentiable ISP 700, the plurality of functional modules include an enhancement network 640 comprising a convolutional neural network configured to process images received by the enhancement network (shown as sharpened images 614) to generate enhancement network output images 652 by filtering non-Gaussian noise. The color correction module 630 in this embodiment is configured to provide its color-corrected images 615 to the enhancement network 640, and the tone map correction module 632 is configured to receive as its image inputs the enhancement network output images 652 instead of the color-corrected images 615. Furthermore, the nine scalar color correction learned parameters c1 through c9 used by the color correction module 630 are not directly learned as ISP learned parameters 252; instead, their values are generated by the color encoder network 633 based on the sharpened images 614.

The color encoder network 633 may be implemented as a convolutional neural network (CNN) comprising a further subset of the ISP learned parameters 252, i.e. the weights of the CNN. The color encoder network 633 is configured to generate the color correction matrix 639 (i.e. the nine scalar color correction learned parameters c1 through c9) based on the images received by the color correction module (i.e. the sharpened images 614).

Trichromatic pixel values need to be remapped to the target illuminant via the 3×3 scalar color correction matrix 639 in the color correction module 630. This requires an estimation of the scene illuminant and the color correction matrix estimation. In the described examples, the process of chromatic adaptation is performed using the color encoder network 633, whose parameters may be denoted as $w_{CE}$. The color encoder network 633 takes the image in the sensor's 102 color space and finds a color mapping operator to the target color domain (i.e. the color space of the adapted image visual domain). The color encoder network 633, as shown, may be a relatively small and light-weight (i.e. few parameters) CNN, consisting of only three contracting convolutional layers followed by a fully-connected layer which outputs 9 values to form the 3×3 color correction matrix 639. A first convolution layer 634 may use p filters with s=2. A second convolution layer 635 may use 2p filters with s=2. And a third convolution layer 636 may use 4p filters with s=2. A fully connected block 637, including one or more hidden layers followed by the fully-connected output layer, is then used to generate the color correction matrix 639. A hyperparameter p determines the number of hidden layers in the fully connected block 637; the value of p may be set based on the availability of memory and the level of acceptable latency.

The enhancement network 640 is used to enhance the color-corrected images 615 before they are processed by the tone map correction module 632. Using a CNN for the enhancement network 640 may provide robustness against various conditions such as different lighting conditions, more severe blur and noise, etc. However, a large network with a large number of parameters may make it inefficient to be used in an end-to-end machine vision system. Thus, a shallow CNN-based reconstruction network may be used for the enhancement network 640 instead of larger models described in the existing literature as replacements for an entire ISP.

The enhancement network 640 is used to enhance the image with respect to non-Gaussian noise and other artifacts that are commonly caused by dead pixels or saturated pixels. The enhancement network 640 is a light-weight CNN consisting of a combination of convolution layers 642, 648, 650 and r intermediate residual blocks 644 through 646. The first convolution layer 642 may have $m_1$ filters with s=1. The second convolution layer 648 may have $m_2$ filters with s=1. The third convolution layer 650 may have $m_3$ filters with s=1. The first residual blocks 644 may have $n_1$ filters with s=1. The rth residual blocks 646 may have $n_r$ filters with s=1. The numbers of filters in different layers $m_1$, $m_2$, $m_3$, $n_1, \ldots, n_r$, and the number of residual blocks r, may be set based on the availability of memory and the level of acceptable latency of the computing system 200 implementing the end to end machine vision system 302.

It will be appreciated that some embodiments may omit either the enhancement network 640 or the color encoder network 633. If the color encoder network 633 is omitted, the color correction matrix 639 consists of ISP learned parameters as in the ISP 600 of FIG. 6.

In the second block-wise differentiable ISP 700 of FIG. 7, the same ISP training method 500 may be used, but it will operate to optimize a set of ISP learned parameters denoted as:

$w_{ISP}=\{w_{NN}, w_{CE}, b, w, s_\alpha, s_\beta, h_R, h_G, h_B, s_\gamma, g_R, g_G, g_B, k_R, k_G, k_B, \gamma, k, \gamma1, \gamma2\}$.

The second block-wise differentiable ISP 700 may be used to design and train an end-to-end machine vision system 302 that is more robust to various conditions such as lighting, blur, and noise due to the presence of the CNN reconstruction and its greater capacity to reconstruct images. Compared to a pure CNN-based raw image to RGB reconstruction architecture, the use of the differentiable functional modules 622 through 632 in the second block-wise differentiable ISP 700 results in a significantly smaller network, and consequently a smaller set of learned parameters. Therefore, the ISP 700 may remain efficient enough for joint use with the perception module 110 in the end-to-end machine vision system 302.

The examples described herein can potentially replace any traditional machine vision system which relies on convolutional neural networks for analytic perception tasks, for example in the fields of robotics, autonomous driving, mobile phones, medical diagnoses, etc.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory processor-readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for training a differentiable image signal processor (ISP) of a machine vision system using machine learning, the differentiable ISP comprising a plurality of functional modules, each functional module in the plurality of functional modules comprising a respective subset of the learned parameters of the differentiable ISP, each functional module in the plurality of functional modules performs a respective image processing task, each image processing task being selected from a list consisting of black level correction, demosaicing, white balancing, sharpening, color correction, and tone map correction, the plurality of functional modules comprising, in series,
 a black level correction module for processing the raw images to generate black-level corrected images based on learned parameters comprising a black value and a white value;
 a demosaicing module for processing the black-level corrected images to generate demosaiced images by performing color-channel filtering based on learned parameters comprising:
  three low-pass filters corresponding to three color channels of the black-level corrected images, each low-pass filter comprising four scalar learned parameter values; and
  three scalar weight factors for controlling inter-channel correlation of high-frequency characteristics;
 a white balancing module for generating white-balanced images by applying gain to each of the three color channels of the demosaiced images based on learned parameters comprising three gain values;
 a sharpening module for generating sharpened images by deblurring each color channel of the white-balanced images in the frequency domain based on learned parameters comprising three deblurring matrices corresponding to the three color channels, each deblurring matrix comprising no more than 100 scalar learned parameters;
 a color correction module for generating color-corrected images by applying a color correction matrix to the three color channels of the sharpened images, the color correction matrix being a three-by-three matrix comprising nine scalar color correction learned parameters; and
 a tone map correction module for generating the adapted images by applying gamma correction and sigmoid curve remapping the color-corrected images, based on learned parameters comprising:
  a low-intensity curve parameter for determining a curve to be applied to low-intensity pixels;
  a high-intensity curve parameter for determining a curve to be applied to high-intensity pixels; and
  a knee parameter for determining a threshold between low-intensity pixels and high-intensity pixels,
the method comprising:
 obtaining a plurality of raw images captured by a sensor, the raw images being of a sensor-specific type;
 obtaining a plurality of training images that have been used together with supervised learning to train a perception module to perform an image perception task, the training images being of a perception module-specific type;
 training the differentiable ISP, using semi-supervised learning, to process the raw images of the sensor-specific type to generate adapted images of the perception module-specific type, using the plurality of training images and the plurality of raw images.

2. The method of claim 1, wherein training the differentiable ISP using semi-supervised learning comprises:
 classifying, using a discriminator, the training images and the adapted images, thereby generating classification information comprising binary classification information;
 generating discriminator loss information and differentiable ISP loss information based on the classification information;
 processing the differentiable ISP loss information to adjust a plurality of learnable parameters of the differentiable ISP; and
 processing the discriminator loss information to adjust a plurality of learnable parameters of the discriminator.

3. The method of claim 2, wherein training the differentiable ISP using semi-supervised learning further comprises alternating between:
 repeating, one or more times, generating the discriminator loss information and processing the discriminator loss information to adjust the plurality of learnable parameters of the discriminator; and
 repeating, one or more times, generating the differentiable ISP loss information and processing the differentiable ISP loss information to adjust the plurality of learnable parameters of the differentiable ISP.

4. The method of claim 1, wherein the discriminator comprises a convolutional neural network.

5. A non-transitory processor-readable medium having stored thereon values of a plurality of learned parameters of a differentiable image signal processor configured and trained in accordance with claim 1.

6. A machine vision system, comprising a differentiable image signal processor (ISP) including a block-wise differentiable image signal processor comprising a plurality of functional modules, each functional module of the plurality of functional modules comprising a respective subset of the learned parameters of the differentiable ISP, and each functional module being configured to perform a respective image processing task, each image processing task being selected from a list consisting of black level correction, demosaicing, white balancing, sharpening, color correction, and tone map correction, wherein the differentiable ISP is trained by:
obtaining a plurality of raw images captured by a sensor, the raw images being of a sensor-specific type;
obtaining a plurality of training images that have been used together with supervised learning to train a perception module to perform an image perception task, the training images being of a perception module-specific type;
training the differentiable ISP, using semi-supervised learning, to process the raw images of the sensor-specific type to generate adapted images of the perception module-specific type, using the plurality of training images and the plurality of raw images, and wherein the plurality of functional modules comprise, in series:
a black level correction module for processing the raw images to generate black-level corrected images based on learned parameters comprising a black value and a white value;
a demosaicing module for processing the black-level corrected images to generate demosaiced images by performing color-channel filtering based on learned parameters comprising:
three low-pass filters corresponding to three color channels of the black-level corrected images, each low-pass filter comprising four scalar learned parameter values; and
three scalar weight factors for controlling inter-channel correlation of high-frequency characteristics;
a white balancing module for generating white-balanced images by applying gain to each of the three color channels of the demosaiced images based on learned parameters comprising three gain values;
a sharpening module for generating sharpened images by deblurring each color channel of the white-balanced images in the frequency domain based on learned parameters comprising three deblurring matrices corresponding to the three color channels, each deblurring matrix comprising no more than 100 scalar learned parameters;
a color correction module for generating color-corrected images by applying a color correction matrix to the three color channels of the sharpened images, the color correction matrix being a three-by-three matrix comprising nine scalar color correction learned parameters; and
a tone map correction module for generating the adapted images by applying gamma correction and sigmoid curve remapping the color-corrected images, based on learned parameters comprising:
a low-intensity curve parameter for determining a curve to be applied to low-intensity pixels;
a high-intensity curve parameter for determining a curve to be applied to high-intensity pixels; and
a knee parameter for determining a threshold between low-intensity pixels and high-intensity pixels.

7. The machine vision system of claim 6, further comprising the perception module, the perception module being configured to perform the image perception task by processing adapted images of the perception module-specific type.

8. The machine vision system of claim 7, wherein:
the plurality of training images were generated by a previous image signal processor by processing a previous plurality of raw images of a previous sensor-specific type; and
the previous plurality of raw images were generated by a previous sensor.

9. The machine vision system of claim 7, further comprising a sensor configured to generate the raw images of the sensor-specific type.

10. The machine vision system of claim 6, wherein:
the plurality of functional modules comprises an enhancement network comprising a convolutional neural network configured to process images received by the enhancement network to generate enhancement network output images by filtering non-Gaussian noise.

11. The machine vision system of claim 6, wherein:
the plurality of functional modules comprises a color correction module for generating color-corrected images by applying a color correction matrix to three color channels of images received by the color correction module; and
the differentiable image signal processor further comprises a color encoder network comprising a convolutional neural network comprising a further subset of the learned parameters of the differentiable ISP, the color encoder network being configured to generate the color correction matrix based on the images received by the color correction module.

12. A computing system, comprising:
a processor device; and
a memory storing machine-executable instructions that, when executed by the processing device, cause the computing system to operate a differentiable image signal processor (ISP) including a block-wise differentiable image signal processor comprising a plurality of functional modules, each functional module of the plurality of functional modules comprising a respective subset of the learned parameters of the differentiable ISP, and each functional module being configured to perform a respective image processing task, each image processing task being selected from a list consisting of black level correction, demosaicing, white balancing, sharpening, color correction, and tone map correction,
wherein the differentiable ISP is trained by:
obtaining a plurality of raw images captured by a sensor, the raw images being of a sensor-specific type;
obtaining a plurality of training images that have been used together with supervised learning to train a perception module to perform an image perception task, the training images being of a perception module-specific type;
training the differentiable ISP, using semi-supervised learning, to process the raw images of the sensor-specific type to generate adapted images of the perception module-specific type, using the plurality of training images and the plurality of raw images, and wherein the plurality of functional modules comprise, in series:
- a black level correction module for processing the raw images to generate black-level corrected images based on learned parameters comprising a black value and a white value;
- a demosaicing module for processing the black-level corrected images to generate demosaiced images by performing color-channel filtering based on learned parameters comprising:
  - three low-pass filters corresponding to three color channels of the black-level corrected images, each low-pass filter comprising four scalar learned parameter values; and
  - three scalar weight factors for controlling inter-channel correlation of high-frequency characteristics;
- a white balancing module for generating white-balanced images by applying gain to each of the three color channels of the demosaiced images based on learned parameters comprising three gain values;
- a sharpening module for generating sharpened images by deblurring each color channel of the white-balanced images in the frequency domain based on learned parameters comprising three deblurring matrices corresponding to the three color channels, each deblurring matrix comprising no more than 100 scalar learned parameters;
- a color correction module for generating color-corrected images by applying a color correction matrix to the three color channels of the sharpened images, the color correction matrix being a three-by-three matrix comprising nine scalar color correction learned parameters; and
- a tone map correction module for generating the adapted images by applying gamma correction and sigmoid curve remapping the color-corrected images, based on learned parameters comprising:
  - a low-intensity curve parameter for determining a curve to be applied to low-intensity pixels;
  - a high-intensity curve parameter for determining a curve to be applied to high-intensity pixels; and
- a knee parameter for determining a threshold between low-intensity pixels and high-intensity pixels.

13. The computing system of claim 12, further comprising a sensor configured to generate the raw images.

14. The computing system of claim 12, wherein:
the plurality of functional modules comprises an enhancement network comprising a convolutional neural network configured to process images received by the enhancement network to generate enhancement network output images by filtering non-Gaussian noise.

15. The computing system of claim 12, wherein:
the plurality of functional modules comprises a color correction module for generating color-corrected images by applying a color correction matrix to three color channels of images received by the color correction module; and
the differentiable image signal processor further comprises a color encoder network comprising a convolutional neural network comprising a further subset of the learned parameters of the generator, the color encoder network being configured to generate the color correction matrix based on the images received by the color correction module.

16. A non-transitory processor-readable medium having machine-executable instructions stored thereon which, when executed by a processor device of a computing system, cause the computing system to operate a differentiable image signal processor (ISP) including a block-wise differentiable image signal processor comprising a plurality of functional modules, each functional module of the plurality of functional modules comprising a respective subset of the learned parameters of the differentiable ISP, and each functional module being configured to perform a respective image processing task, each image processing task being selected from a list consisting of black level correction, demosaicing, white balancing, sharpening, color correction, and tone map correction, wherein the differentiable ISP is trained by:
- obtaining a plurality of raw images captured by a sensor, the raw images being of a sensor-specific type;
- obtaining a plurality of training images that have been used together with supervised learning to train a perception module to perform an image perception task, the training images being of a perception module-specific type;
- training the differentiable ISP, using semi-supervised learning, to process the raw images of the sensor-specific type to generate adapted images of the perception module-specific type, using the plurality of training images and the plurality of raw images, and wherein the plurality of functional modules comprise, in series:
- a black level correction module for processing the raw images to generate black-level corrected images based on learned parameters comprising a black value and a white value;
- a demosaicing module for processing the black-level corrected images to generate demosaiced images by performing color-channel filtering based on learned parameters comprising:
  - three low-pass filters corresponding to three color channels of the black-level corrected images, each low-pass filter comprising four scalar learned parameter values; and
  - three scalar weight factors for controlling inter-channel correlation of high-frequency characteristics;
- a white balancing module for generating white-balanced images by applying gain to each of the three color channels of the demosaiced images based on learned parameters comprising three gain values;
- a sharpening module for generating sharpened images by deblurring each color channel of the white-balanced images in the frequency domain based on learned parameters comprising three deblurring matrices corresponding to the three color channels, each deblurring matrix comprising no more than 100 scalar learned parameters;
- a color correction module for generating color-corrected images by applying a color correction matrix to the three color channels of the sharpened images, the color correction matrix being a three-by-three matrix comprising nine scalar color correction learned parameters; and a tone map correction module for generating the adapted images by applying gamma correction and sigmoid curve remapping the color-corrected images, based on learned parameters comprising:
  a low-intensity curve parameter for determining a curve to be applied to low-intensity pixels;
  a high-intensity curve parameter for determining a curve to be applied to high-intensity pixels; and
a knee parameter for determining a threshold between low-intensity pixels and high-intensity pixels.

* * * * *